US006685135B2

(12) United States Patent
Geissler

(10) Patent No.: US 6,685,135 B2
(45) Date of Patent: *Feb. 3, 2004

(54) LIFT SYSTEM INTENDED FOR FREE-FALLING PERSONS

(76) Inventor: Alban Geissler, Rheinallee 33, D-55294 Bodenheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,113

(22) PCT Filed: Nov. 11, 1998

(86) PCT No.: PCT/DE98/03316
§ 371 (c)(1),
(2), (4) Date: Oct. 13, 1999

(87) PCT Pub. No.: WO99/24319
PCT Pub. Date: May 20, 1999

(65) Prior Publication Data
US 2002/0195519 A1 Dec. 26, 2002

(30) Foreign Application Priority Data
Nov. 11, 1997 (DE) .......................... 197 49 936

(51) Int. Cl.[7] ................................ B64C 31/02
(52) U.S. Cl. ........................ 244/4 A; 244/16
(58) Field of Search ................ 244/16, 4 A, 4 R, 244/49, 142, 151 R, 901, 900

(56) References Cited

U.S. PATENT DOCUMENTS

| 1,052,199 | A | * | 4/1913 | Zeise |
| 1,506,624 | A | * | 8/1924 | Forchione |
| 1,600,876 | A | | 9/1926 | Grzybala |
| 1,765,075 | A | * | 6/1930 | Johnson |
| 1,845,913 | A | * | 2/1932 | Goodman |
| 2,067,423 | A | * | 1/1937 | Sohn et al. |
| 2,181,326 | A | * | 11/1939 | Griffin |
| 2,810,985 | A | * | 10/1957 | Bilder |
| 3,104,082 | A | * | 9/1963 | Polhamus |
| 3,173,629 | A | * | 3/1965 | Uhor |
| 3,285,545 | A | * | 11/1966 | Bolt |
| 3,679,157 | A | | 7/1972 | Roberts et al. |
| 3,813,061 | A | | 5/1974 | Greenhalgh |
| 3,817,478 | A | | 6/1974 | McDonald |
| 3,964,697 | A | * | 6/1976 | Mays |
| 4,253,625 | A | * | 3/1981 | Dmitrowsky |
| 5,348,256 | A | * | 9/1994 | Parikh |

FOREIGN PATENT DOCUMENTS

| DE | 393687 | 1/1922 |
| DE | 2176003 | 5/1976 |
| DE | 37 02 893 | 1/1987 |
| DE | 43 26 416 | 8/1993 |
| FR | 654.004 | 3/1929 |
| FR | 2 2611 78 | 2/1974 |
| FR | 2 634 726 | 7/1988 |

OTHER PUBLICATIONS

Léo Valentin, "Bird Man," Translated from the French "Homme–oiseau," French Edition, 1954.

* cited by examiner

Primary Examiner—Tien Dinh
(74) Attorney, Agent, or Firm—Davis & Bujold, PLLC

(57) ABSTRACT

A lift system is described for free-falling persons including a lift body with a belt system which can be detachably attached to a person. The lift body is designed so that it defines a direction of flight in the longitudinal axis of the person, and a device for detaching the lift system in a free-fall phase, a flight phase or a landing phase from the person. The lift body has an overall delta-wing shaped design.

8 Claims, 2 Drawing Sheets

LIFT SYSTEM INTENDED FOR FREE-FALLING PERSONS

It is known that parachutists and sky divers can vary their position relative to the direction of fall by having their bodies assume different positions during the free-fall phase of their dive. Deviations of a few degrees relative to the undisturbed ballistic falling curve can even be achieved through favorable body positions. However, the aerodynamic control forces that can be achieved are not sufficient to significantly change the flight path.

The problem on which the present invention is based is that a person in free fall is not capable of significantly altering his flight path.

This problem is solved by a lift system for free-falling persons including a lift body with a belt system which can be detachably attached to a person, where the lift body is designed so that it defines a direction of flight in the longitudinal axis of the person, the lift body having an overall delta-wing shaped design; and a device for detaching the lift body in a free-fall phase, a flight phase or a landing phase from the person. Other advantageous embodiments are derived from the description.

The advantages achieved with the present invention consist of the fact that a human in free fall is enabled to convert control motions of his/her extremities and head into effective changes in direction with the help of lift surfaces. Furthermore, the additional lift yields the advantage of significantly prolonging the free-fall phase and converting it into a gliding phase.

Figure 1:
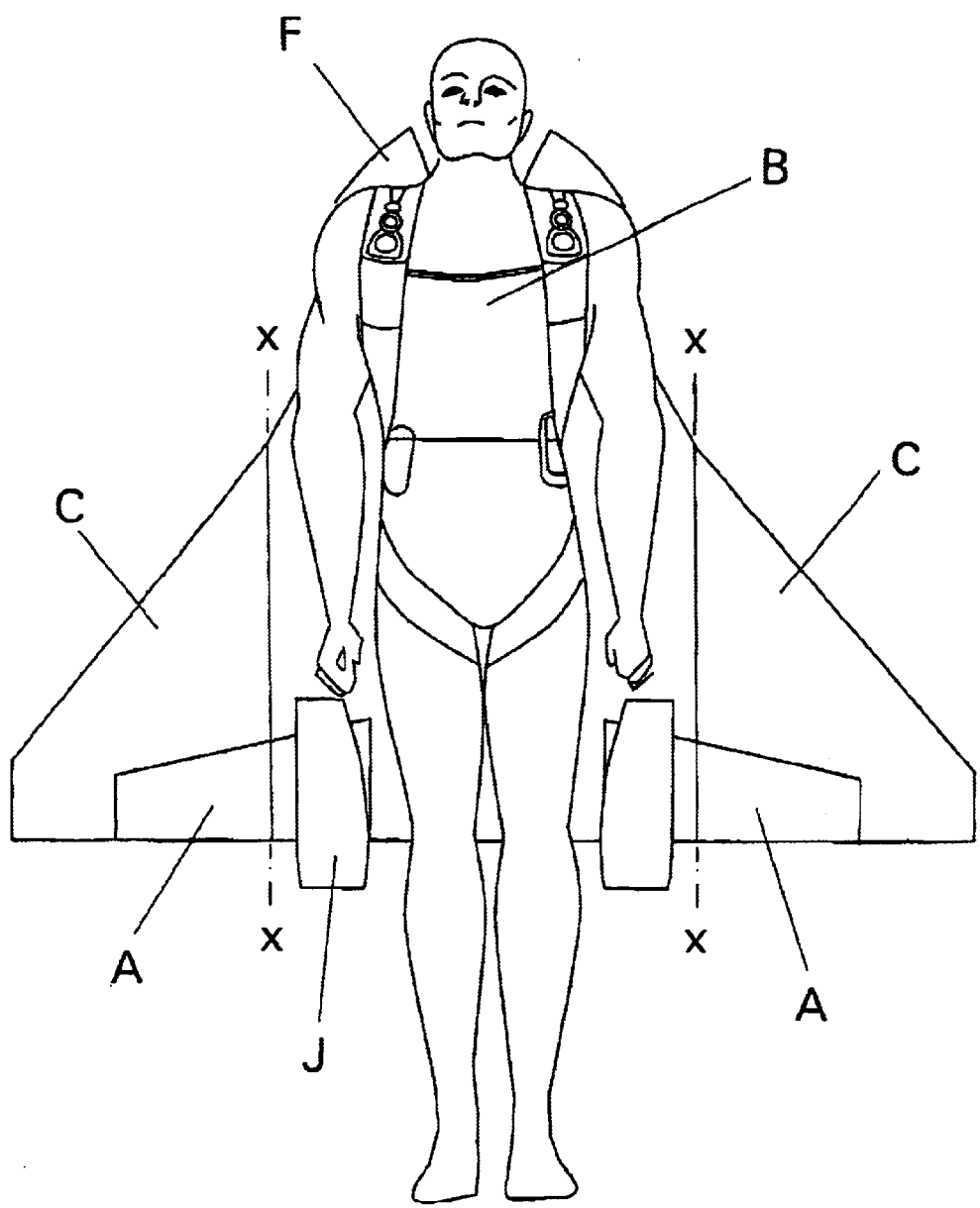
Figure 2:
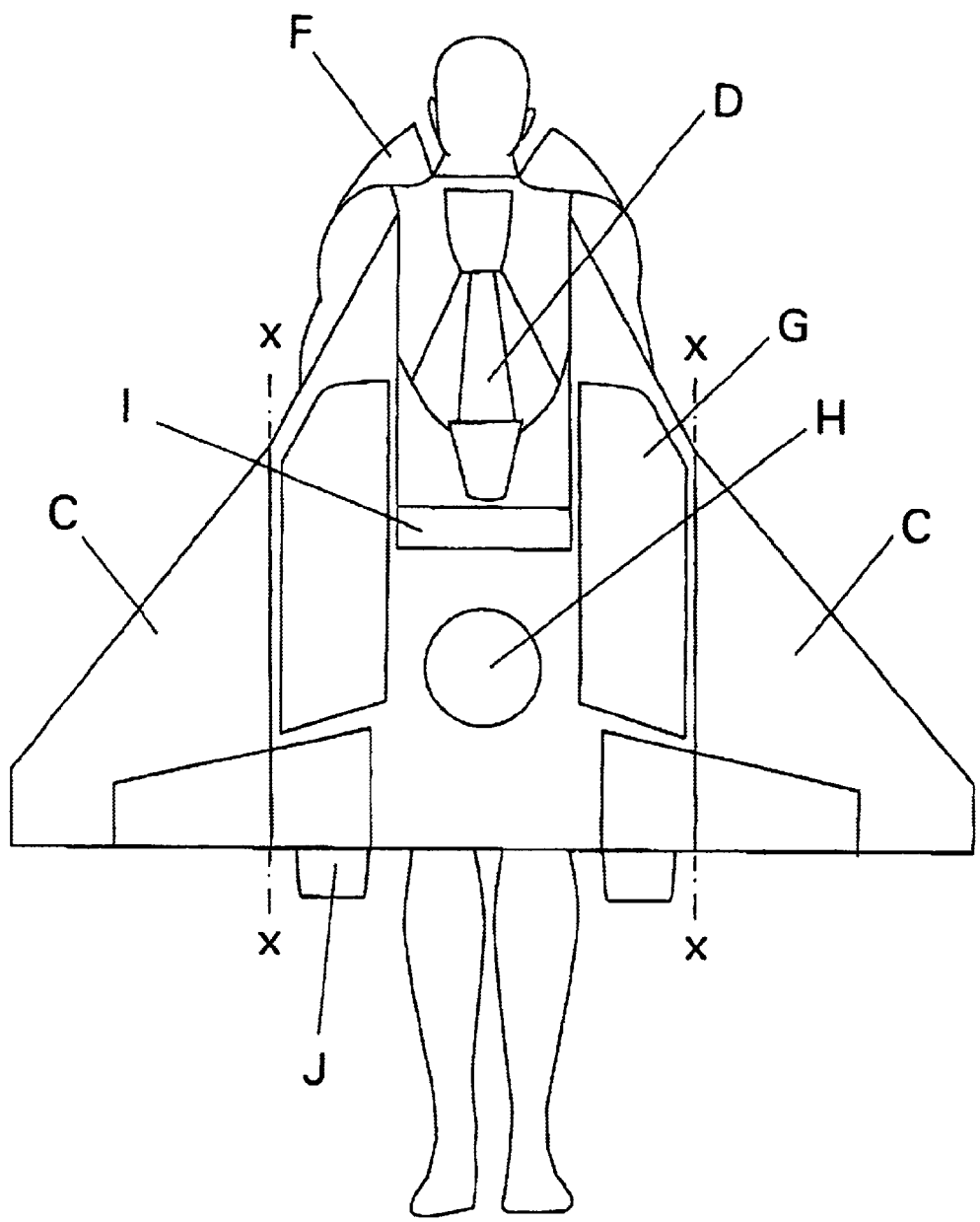

The object of this invention is explained in greater detail below on the basis of a drawing illustrating the embodiment, where FIG. 1 shows a front view of a person with a lift system as described above, and FIG. 2 shows a rear view of a person with a lift system as described above.

To achieve a stable flight position, it is advantageous to impart an overall shape in the form of a delta wing to the system as a whole, because a delta wing (backswept wing) has the property of inherent stability. The use of other wing designs requires the use of tail units or stabilization surfaces. The person's extremities and even his/her head are used for control in the free-flight phase. In contrast with other methods, it is not essentially necessary to have one's extremities attached to the lift surfaces or to use control surfaces for control purposes. This leads to a freer feeling in flight. It may be necessary to integrate additional aerodynamic control surfaces (A) which are controlled by the extremities into the system, depending on the characteristics of the system as a whole (the person and the lift system). To prevent the forces on the human body that occur in maneuvering from becoming too great, the largest possible area must be used for force induction of the mainly positive (dorsal) and negative (ventral) forces and moments that occur in flight as well as all other forces and moments. A belt system or a chest harness (B), shown in the drawing as a modified parachute harness, which also makes it possible to transmit forces to the person's pelvic area, fulfills this function the best. For better wearability, it may be made entirely or partially of flexible materials or it may be only partially closed. This also permits better ventilation for the person. To optimize the lift, the lift body (E) is adapted to the aerodynamic requirements of a wing system by molded parts (F) in the shoulder area.

For jumping out or an aircraft, the wing-like widened areas (C) of the lift body are best folded or retracted entirely or partially about axes of rotation (x—x) in order to take into account the limited door width of aircraft. In the initial free-fall phase, these parts can serve to bring the person into a stable falling position. The wing-like widened areas (C) are then unfolded or extracted and locked by a locking means (H) into position either aerodynamically, by muscle force or by using actuators deployed before jumping. For landing, it is appropriate to use a delay system of a different design, such as a parachute system (D) because the minimal flight speed of a lift system like that described above would be much too large because of its wing load in the final flight phase for a person to be able to manage it. The landing process would also require acrobatic body control even with a suitable wing load.

To simplify landing or in an emergency situation, it could be necessary to create the possibility of being able to separate the entire system or parts thereof from the parachute's body in any phase of free fall or landing. This could be accomplished by use of the device for detaching the lift body (I).

To customize the lift system for different situations and uses, the lift system can have mounts to accommodate different elements, such as a reserve parachute (H), at least one drive (J), a control system a weapon (G).

What is claimed is:

1. A sky flying apparatus for prolonging a free-fall phase of a free-falling person, the sky flying apparatus comprising:
   unitary rigid a lift-generating body having a longitudinal axis, a leading edge and a trailing edge, the longitudinal axis of the lift body extending along a longitudinal axis of the free falling person and defining a direction of flight in the free-fall phase, a width of the lift body increasing from the leading edge toward the trailing edge to a width significantly larger than the body of the free-falling person, thereby defining an overall delta wing shaped lift body, the lift body further having a cutout region at the leading edge thereof for accommodating a parachute attached to the free-falling person,
   a belt system attached to the lift body and allowing the lift body to be detachably attached to the free-falling person, and
   a device for detaching the lift body in the free-fall phase, a flight phase or a landing phase from the free-falling person.

2. The skyflying apparatus according to claim 1, wherein one of a mount and container, for accommodating at least one reserve parachute, is mounted on the skyflying apparatus.

3. The skyflying apparatus according to claim 1, wherein the belt system includes a chest harness attached to the lift body, and the chest harness includes a parachute.

4. The skyflying apparatus according to claim 1, wherein the skyflying apparatus further comprises mounts or containers for accommodating at least one drive, control systems and weapons.

5. A sky flying apparatus, for prolonging free-fall of a person wearing the sky flying apparatus, comprising:
   unitary rigid lift-generating body defining a central longitudinal axis, the lift-generating body having a tapering leading edge and a trailing edge with a width of the lift-generating body continuously increasing from the leading edge toward the trailing edge until the leading edge merges with the trailing edge at a maximum width dimension which is significantly larger than a width of the person wearing the sky flying apparatus thereby defining an overall delta wing shaped lift body;

the longitudinal axis of the lift body extending along a longitudinal axis of the person wearing the sky flying apparatus to define a direction of flight for the person during free-fall;

the lift-generating body further having a cutout region, for accommodating a parachute attached to the person, formed along the leading edge and extending rearwardly toward the trailing edge, the cutout region being coincident with the central longitudinal axis of the lift-generating body, and a rearward portion of the lift-generating body spacing the cutout region from the trailing edge; and a belt system attached to an undersurface of the lift-generating body for allowing the lift-generating body to be releasably attached and detached from the person.

6. The skyflying apparatus according to claim 5, wherein the skyflying apparatus further comprises one of a mount and a container for accommodating at least one reserve parachute.

7. The skyflying apparatus according to claim 5, wherein the skyflying apparatus further comprises a belt system with a chest harness attached to the lift-generating body, and the chest harness includes a parachute.

8. The skyflying apparatus according to claim 5, wherein the skyflying apparatus further comprises at least one mount for accommodating one of a drive, a control system and a weapon.

\* \* \* \* \*